Oct. 22, 1946.   C. OTTO   2,409,790
APPARATUS FOR THE PRODUCTION OF AMMONIUM SULPHATE
Filed March 8, 1944   2 Sheets-Sheet 2
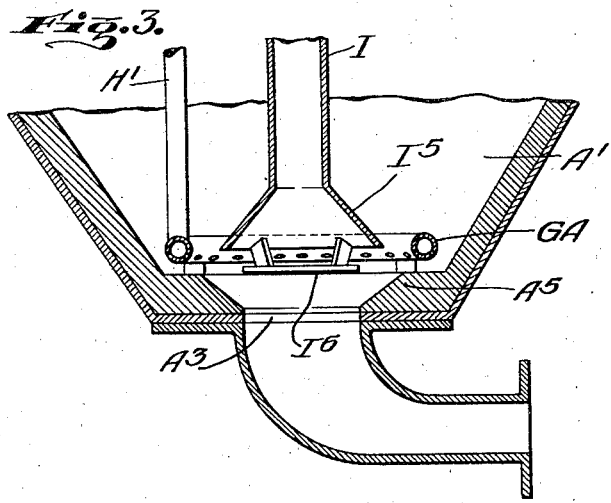
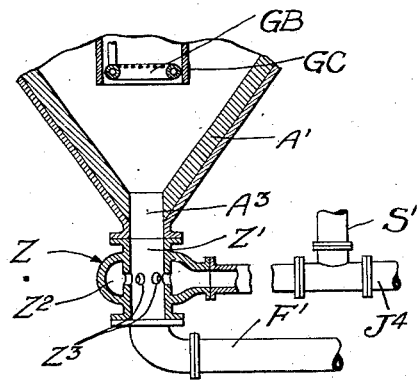
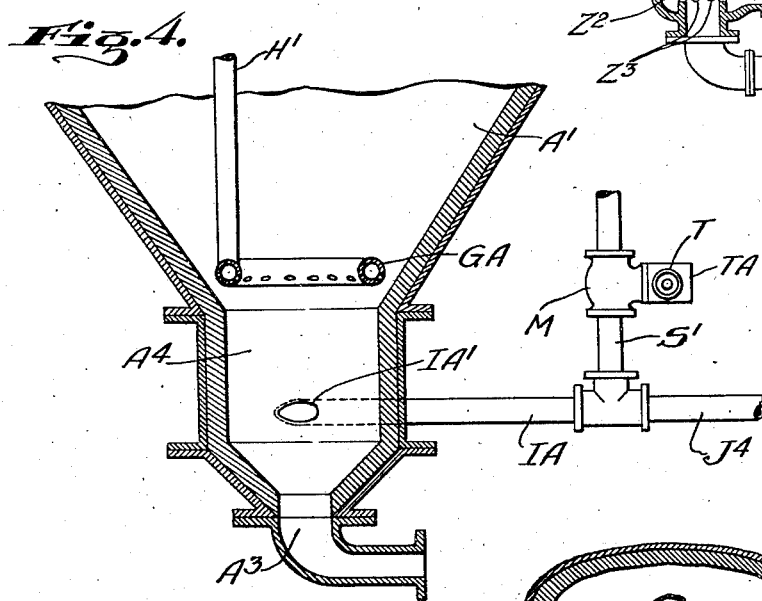
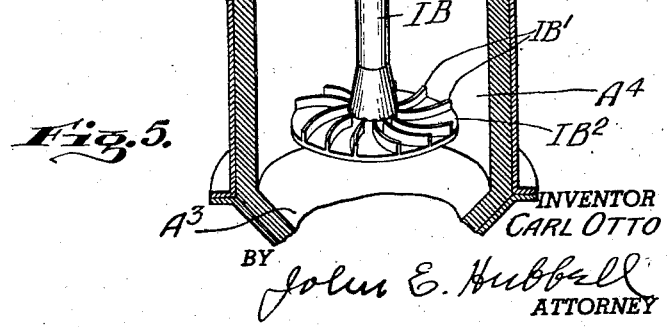

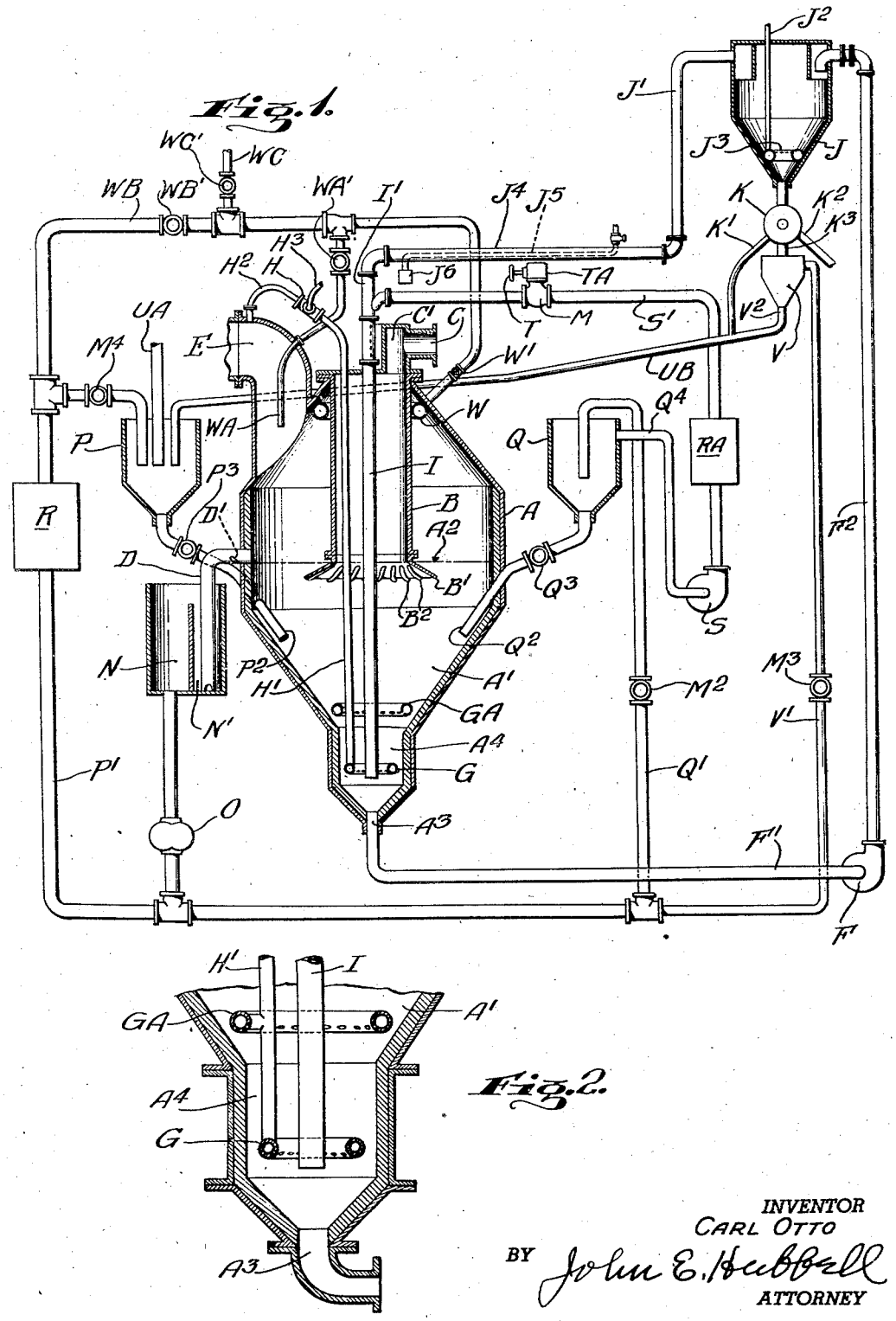

Patented Oct. 22, 1946

2,409,790

UNITED STATES PATENT OFFICE 2,409,790

APPARATUS FOR THE PRODUCTION OF AMMONIUM SULPHATE

Carl Otto, Manhasset, N. Y., assignor to Fuel Refining Corporation, New York, N. Y., a corporation of Delaware Application March 8, 1944, Serial No. 525,544

2 Claims. (Cl. 23—273)

The general object of the present invention is to provide an improved apparatus for converting the ammonia content of distillation gas, and particularly of coke oven gas, into ammonia sulphate by passing the gas into a so-called saturator containing a bath of weak sulphuric acid with which the gas is brought into scrubbing contact so that the ammonia elements in the gas and the sulphuric acid elements in the bath combine to form sulphate of ammonia which subsequently crystallizes out of the solution.

The invention relates particularly to the construction and operation of a saturator adapted for use and used in the production of relatively large sulphate of ammonia crystals. Heretofore, very little of the substantial amount of sulphate of ammonia produced in this country by passing coke oven gas through saturators, has been in the form of large crystals. However, the term "large," as used herein, is well established in the art and indicates crystals of an average size and weight several times that of the finer crystals heretofore customarily produced. For example, the term "Grade A" ammonium sulphate crystals is a well known term of art applying to sulphate comprising crystals of which 40% are too large to pass a 35 mesh screen and only 5% are small enough to pass through a 80 mesh screen, whereas of the fine sulphate of ammonium crystals commonly produced in saturators, 80% or more will pass through a 35 mesh screen and about 20% or more will pass through a 80 mesh screen.

In the production of sulphate of ammonia in the general manner described, the crystals formed are initially minute and become large crystals only as a result of crystal growth requiring movement of the crystals relative to the "mother liquor" or bath liquor out of which the fine crystals crystallize and in which they grow. A small sulphate of ammonia crystal increases in size, or grows, because it forms a nucleus for the attachment of other sulphate of ammonia crystallizing out of the bath liquor. For such growth it is practically essential that the bath liquor be subjected to agitation or recirculation so that each small crystal may be continually moving out of immediate contact with bath liquor which lacks, and be moving into immediate contact with bath liquor which does not lack sulphate of ammonia available for immediate attachment to the growing crystal.

For the desired crystal growth necessary for the production of large sulphate of ammonia crystals, it is also practically essential that the acidity of the bath liquor should be lower than is necessary or customary in the production of fine crystals. Thus, for example, the acidity of the bath liquor commonly employed in the production of fine crystals is that corresponding to a bath liquor sulphuric acid content of 7 per cent or higher, whereas the acidity of the bath liquor employed in the production of large crystals may well be that corresponding to a bath liquor acid content of 5.5 per cent or lower.

The low acidity of the bath liquor tends to troublesome deposits of sulphate of ammonia, commonly called "rocksalt," on exposed saturator surfaces above and within the bath, and the maintenance of conditions tending to minimize "rocksalt" deposits is practically important in the production of large sulphate of ammonia crystals. The relatively low acidity required for the production of large sulphate of ammonia crystals also increases the extent, and/or effectiveness of the scrubbing contact of the ammonia containing gas and bath liquor required to recover all the ammonia content of the gas.

The production of large sulphate or ammonia crystals in the manner contemplated herein is a continuous process and the bath liquor normally contains crystals which are in all stages of growth and size. The larger crystals tend to collect in the lower portion of the usual hopper bottom of the saturator, and in the arrangements shown, are withdrawn from the saturator in a carrying stream of bath liquor by a pump which may be a centrifugal pump or a jet pump, and in either case has its inlet open to the saturator at or adjacent the lower end of the latter.

A main object of the present invention is to provide an improved method of and means for minimizing the fine crystal content of the crystals separated from the bath liquor by enveloping the crystals removed from the bath in a carrying stream of bath liquor which has a fine or small crystal content smaller than the average fine or small crystal content of the bath, and which carries the crystals from the saturator to apparatus including a centrifuge in which crystals are separated from the carrying stream liquor and dried.

This application is a continuation in part of my application Ser. No. 473,950, filed January 29, 1943. In application Ser. No. 473,950 and in my application Ser. No. 492,265, filed June 25, 1943, I have disclosed a novel method of, novel means for producing sulphate of ammonia, said method being claimed in said application Ser. No. 492,265. My novel method is characterized by the maintenance of a bath liquor zone, which I call a separation zone, at the bottom of the saturator bath and in which the small crystal content of the bath liquor is smaller than in the body of the bath. The relatively large crystals produced in the bath settle in said zone and are moved out of the saturator in a carrying stream of bath liquor withdrawn from said zone. The relative small amount of small crystals in the separation zone is due, in part, to the maintenance of flow conditions which tend to minimize the movement of small crystals into the zone from the bath liquor external to said zone, and due in part to the return to said zone of bath liquor previously withdrawn from the saturator and treated to reduce its crystal content.

The present invention comprises improvements in apparatus well adapted for use in carrying out the method disclosed and claimed in said prior application Ser. No. 492,265. The present invention is characterized in particular by its novel provisions for maintaining bath liquor agitation and turbulent flow conditions and which contribute to desirable crystal growth conditions and to a desirably low small crystal content in the crystal carrying stream of liquor withdrawn from the zone and minimize the risk of the adherence of crystal masses to, or rocksalt deposits on the portion of the saturator wall adjacent the separation zone.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a somewhat diagrammatic view, partly in section, illustrating a preferred form of apparatus for use in the practice of my invention;

Fig. 2 is an enlarged sectional elevation of the crystal discharge portion of the saturator shown in Fig. 1; and Figs. 3, 4 and 6 are sectional elevations, and Fig. 5 is a perspective view, each illustrating a different modification of the crystal discharge arrangement shown in Fig. 2.

The apparatus shown in Fig. 1 of the drawings comprises a saturator tank A having a cylindrical body portion and a conical, or hopper bottom, portion A'. Coke oven gas is passed into the saturator through an axially disposed cracker pipe B, which receives gas at its upper end above the saturator through an inlet chamber C' from a gas main C. The cracker pipe B comprises a lower end section B' forming an outwardly flared discharge mouth below the level $A^2$ of the acid bath which fills the lower portion of the saturator and in which the discharge end B' of the cracker pipe is submerged. The mouthpiece B' is formed with curved ribs $B^2$ at its internal or under side. The ribs $B^2$ tend to maintain a circulatory movement about the cracker pipe axis of the bath liquor in the upper portion of the bath.

As shown in Fig. 1, the bath level $A^2$ may be regulated by adjusting a weir D' in an overflow outlet D through which, in normal operation, bath liquor constantly outflows to remove from the saturator tar separating from the gas treated in the saturator. The gas which passes downward through the cracker pipe B into the bath and bubbles up through the latter, passes out of the saturator through an outlet connection E which leads away from the gas space of the saturator through a port in the conical top wall of the saturator. Sulphate crystals formed in the saturator and collecting in the lower end of its hopper bottom portion, are withdrawn, along with bar liquor forming a carrying stream for the crystals, by a suitable pumping device. In the form shown in Fig. 1 said device is a centrifugal pump F having its inlet F' connected to an outlet opening $A^3$ at the bottom of the saturator.

For the production of desirably large ammonium sulphate crystals, it is desirable that a suitably large portion of the small crystals, and all of the crystals are small when initially formed, be kept away from the outlet $A^3$ until they have suitably increased in size. To this end, fluid jets are discharged into the lower portion of the bath adjacent the saturator outlet $A^3$ of Figs. 1 and 2, through annular spray pipes G and GA, and through vertically disposed pipe I which extends axially through the cracker pipe B. The fluid discharged through spray pipes may well consist, or be a gaseous mixture including air coke oven gas or ammonia vapors. As shown, the spray pipes G and GA are supplied with gaseous fluid through the outlet pipe H' from a steam jet ejector H having its inlet $H^2$ connected to and drawing gas from the saturator gas outlet pipe E, and receiving steam through a motive fluid supply pipe $H^3$. The fluid passed into the bath through the pipe I, is bath liquor previously withdrawn from the bath and subjected to a crystal eliminating effect. It should be noted, that while there is ordinarily some advantage in using coke oven gas rather than air for saturator bath agitation and recirculating purposes, the amount of air required for the intended operation of the spray pipes G and GA is not great enough to significantly affect the composition of the gas passing away from the saturator through its outlets E.

In the particular arrangement shown in Figs. 1 and 2, the outlet $A^3$ communicates with the lower end of the conical bottom portion of the bath space in the saturator A, through a cylindrical chamber $A^4$ which is open at its upper end to said space and is open at its lower end to the outlet $A^3$. The pipe I extends downward into the chamber $A^4$ and the annular spray pipe G is located within the chamber $A^4$ and surrounds the lower end of the pipe I and discharges downwardly directed jets through orifices formed in its under side. The spray pipe GA, which like the pipe G is ordinarily coaxial with the pipe I is larger in diameter than the chamber $A^4$ and is located in the conical bottom space of the tank adjacent the upper end of the chamber $A^4$. Advantageously and as shown, the spray pipe GA also discharges its gas jets through a multiplicity of downwardly directed orifices formed in its under side.

The conjoint effect of the return of treated bath liquor to the tank through the pipe I, and of the discharge of gas jets through spray pipes G and GA as above described, is to maintain a bath liquor separation zone in the chamber $A^4$ and in the immediately adjacent portion of the conical bottom tank space into which relatively large crystals settle and in which the small crystal content of the bath liquor is lower than in the body portion of the bath. With a suitably large rate of return of treated liquor through the pipe I to the separation zone, the liquor in said zone may consist almost entirely of bath liquor which is not supersaturated and has been returned to the saturator after being subjected to a crystal eliminating effect while outside of the saturator.

The gas discharged through the spray pipes G and GA agitates the liquor in and above the separation zone and tends to maintain flow conditions in said zone which offer significantly greater opposition to the settling of small crystals in the separation zone than to the settling therein of large crystals. Said flow conditions not only tend to prevent relatively small crystals from passing into the separation zone from the body of the bath but tend also to expel from the zone small crystals which have moved into the zone from the body of the bath or have been carried into the zone by the liquor returned through the pipe I. When the average rate at which liquor is returned through the pipe I exceeds the rate at which liquor is withdrawn from the saturator through the outlet $A^3$, as will ordinarily and advantageously be the case, the flow of bath liquor through the separation zone and out of the latter at its upper end augments the agitation and desirable flow conditions in the separation zone produced by the gaseous discharge through spray pipes G and GA.

A special advantage is obtained by discharging through the upper pipe GA some or all of the ammonia vapor from the still customarily employed in a by-product coke oven plant for distillation of ammoniacal liquor. The ammonia vapor discharged by the pipe GA increases the ammonia contents and tends to highly super-saturate the bath liquor stream agitated and moved upward above the separation zone and thus contributes directly to the growth of small crystals suspended in said stream. As is well known, the amount of ammonia vapor passing away from the ammoniacal liquor still of an ordinary by-product coke oven plant is quite small in comparison with the amount of coke oven gas passing through the ammonia saturator of the plant. However, the amount of ammonia vapor passing away from the still is large enough for use in creating a definite upflow of bath liquor in the portion of the bath above the spray pipe GA and to modify the composition of that liquor, even when the ammonia vapor passing through the pipe GA is not mixed, as it may be, with air or other gas.

In the normal, contemplated operation of the apparatus shown in Fig. 1, the bath space comprises several zones with bath liquor having different ammonia contents in the different zones. One of those zones which may be called the scrubbing zone includes a portion of the bath space which is substantially coaxial with the cracker pipe and larger in diameter than the cracker pipe mouthpiece but considerably smaller in diameter than the saturator tank at the bath level, and which extends downward from the bath level and has its bottom a short distance below the underside of the cracker pipe. In normal operation the bath liquor in the scrubbing zone is super-saturated so that sulphate of ammonia is constantly crystallizing out of the scrubbing zone bath liquor and forming small new sulphate of ammonia crystals and enlarging previously formed crystals in the scrubbing zones.

The separation zone beneath the spray pipe GA and including the liquor space within the chamber $A^4$, contains bath liquor which is not significantly super-saturated and preferably is about fully saturated with sulphate of ammonia so that it has no tendency to dissolve or to enlarge sulphate of ammonia crystals with which it comes into contact.

A third zone above the spray pipe GA and between the latter and the scrubbing zone may be designated as an upflow zone. In that zone the bath liquor is caused to flow upward from the level of the spray pipe GA, by the gas flowing into the bath liquor from that pipe and as a result of bath liquor upflow out of the subjacent separation zone. The bath liquor entering the upflow zone consists of non-saturated liquor from the separation zone, and liquor, not highly super-saturated, flowing down through the space surrounding the upflow zone.

When the gas discharged by the spray pipe GA consists wholly or in substantial part of ammonia vapor, the sulphate of ammonia content of the bath liquor in the upflow zone increases with the distance above said spay pipe as a result of the reaction of the ammonia vapor with the sulphuric acid in the bath liquor. In such case the bath liquor in the upper portion of the upflow zone may be super-saturated as highly as, or even higher than the bath liquor in the scrubbing zone. In consequence, the sulphate crystals suspended in the upflow zone of the bath liquor are subjected to conditions especially favorable to crystal growth.

In the arrangement shown in Fig. 1, the liquid and crystal mixture withdrawn from the saturator by the pump F is delivered by the pump discharge pipe $F^2$ to a receptacle or tank J. The latter serves as a feed tank for a subjacent centrifugal separator K, and in the form shown, also serves as a treatment vessel in which crystals and bath liquor received from the saturator are agitated and recirculated to reduce the amount of small crystals passing with the large crystals from the bottom of tank J into the subjacent centrifugal separator K. While some liquor passes with the crystals to the separator K, the major portion of the liquor entering the tank J passes away from the latter through the tank overflow outlet $J'$.

The mixture of liquor and crystals in the tank J is agitated and recirculated by means shown as comprising a pipe $J^2$ through which air or gas is supplied under suitable pressure to a horizontally disposed spray pipe ring $J^3$ provided with a multiplicity of small top outlets. The pipe ring $J^3$ is located in the lower hopper bottom portion of the tank J, and the jets of air discharged by the ring $J^3$ create circulatory movements including upflow and downflow components in the liquid and crystal mass in which the pipe ring is submerged.

In the normal mode of operation contemplated, liquor crystals are passed into the feed tank J from the saturator outlet $A^3$, and the crystals settling to the bottom of the tank J along with a small portion of the bath liquor entering said tank, pass continuously from the tank to a centrifugal seuparator K. The relatively great excess of the inflow through the pipe $F^2$ to the tank J, over the outflow from the tank to the separator K, passes away from the tank J through its overflow outlet $J'$. All of the liquid flowing away from the tank J through the pipe $J'$ may, and as shown, is returned to the saturator.

The air or gas jets discharged by the pipe ring $J^3$ agitate and recirculate the sulphate crystals and liquor in the tank J. The crystal circulation is especially great in the case of the finer crystals which are thereby given opportunity for significant growth or increase in size. The circulation also contributes to the entrainment of much of the fine crystal content in the liquor passing away from the tank J through its outlet $J'$. The circulation and agitating action of the air jets tends to increase the average size of the sulphate crystals passing from the tank J to the centrifugal separator K.

The bath liquor and fine crystals leaving the tank J through its overflow outlet J' pass into the pipe I through a pipe $J^4$ and a pipe fitting or part I' connected to the upper end of the pipe I.

In some cases means may advantageously be provided for heating the bath liquor passing through the pipe $J^4$. As diagrammatically shown in Fig. 1, the liquor passing through the pipe $J^4$, is heated by means of a steam pipe $J^5$ located in and extending longitudinally of the pipe $J^4$ and provided with a trap $J^6$ for the discharge of condensate. Such heating assists in maintaining the desired bath temperature of from 80 degrees F. to 120 degrees F., notwithstanding the saturator heat losses due to radiation, bath liquor evaporation and other causes. Such heating of the bath liquor serves also to prevent or greatly minimize the crystallization of ammonia sulphate out of the bath liquor heated and the heater $J^5$ may dissolve some of the fine crystals passing into the pipe $J^4$ through the feed tank outlet J'.

With the piping arrangement shown in Fig. 1, the liquor supplied to the pipe I may consist wholly of liquor leaving the saturator through its bottom outlet $A^3$ or it may comprise liquor leaving the saturator both through its lateral outlet D and its bottom outlet $A^3$, depending on the adjustment of a valve M as is hereinafter described. The lateral outlet pipe D comprises a down turned discharge end portion which extends downward into a seal pot or chamber N' which is mounted in and overflows into a tar separator tank N. Tar carried out of the saturator through the outlet D and floating to the top of the body of liquor within the tank N, may be skimmed off or otherwise removed from the tank N, which is customarily open at its upper end. Bath liquor from which tar has thus been separated is withdrawn from the tank N by a pump O.

The pump O is adapted to discharge liquor through each of the discharge pipes P', Q' and V', which preferably include throttling valves $M^4$, $M^2$ and $M^3$ respectively. The pipe P' leads to a return pot P from which the liquor passed into the pot is returned to the saturator through a drain pipe $P^2$. The latter includes a cutoff valve $P^3$ and extends downwardly into the tank A and has its lower end immersed in the upper portion of the saturator bath liquor. The return pot P has its upper end open to the atmosphere, and the liquor level in the pot P is dependent on the liquor level in the saturator but is higher than the latter by a distance dependent on the excess of the gas pressure in the gas space of the saturator over the pressure of the atmosphere. As shown, the pipe P' includes a heater R for increasing the temperature of the bath liquor returned to the saturator through the return pot P.

The pipe Q' discharges into a receptacle Q so located that it may discharge liquor received by it into the saturator tank through a drain pipe $Q^2$ including a valve $Q^3$. The pipe $Q^2$ extends into the saturator and has its lower end immersed in the upper portion of the bath liquor in the tank. The receptacle Q is provided with a second outlet $Q^4$ opening to the receptacle at a level somewhat lower than the liquor level normally maintained in the receptacle. As will be apparent, unless the flow capacity of the drain pipe $Q^2$ is unduly small, only a small change in liquor level in the receptacle Q is required to enable the pipe $Q^2$ to return liquor to the saturator at a rate equal to the excess of the flow rate through the pipe Q' over the rate of flow through the outlet pipe $Q^4$, notwithstanding wide variations in said excess.

The outlet $Q^4$ from the receptacle Q is connected to the inlet of a pump S which has its outlet connected through a heater RA, a pipe S' and the previously mentioned valve M and fitting I' to the upper end of the pipe I. As diagrammatically shown in Fig. 1, the valve M may be adjusted manually by a hand wheel T, and if such operation is desired the valve may be given opening and closing adjustments at regular intervals by a suitable automatic valve operating mechanism TA which may include a constantly operating motor or be of other known type.

As shown, the pot P serves as a return pot for bath liquor received through pipes UA and UB, as well as through the pipe P'. The pipe UA is provided to return to the inflow pot P, liquor carried out of the saturator by entrainment in the gas leaving the saturator through its outlet E and separated from the gas in an acid catcher (not shown) which ordinarily is of the cyclone liquid and gas separator type.

The pipe UB is employed to return to the saturator bath liquor separated from the liquor and crystal mixture passing from the feed tank J into the centrifugal separator K. The latter has a liquor outlet K' connected to the pipe UB, and is also provided with an outlet $K^2$ for dried crystals passing from the separator to storage, and an outlet $K^3$ for fine crystals screened out of the crystals passing to storage. As shown in Fig. 1, the outlet $K^3$ discharges into a device V in which the crystals are wetted and entrained in a bath liquor stream which passes into the pipe UB through the outlet $V^2$ from the device V. The bath liquor in said stream is supplied to the device V through the previously mentioned pipe V' connected to the outlet of the pump O and including the throttling valve $M^3$. The device V need not be further described as it forms no part of the invention claimed herein, and is fully disclosed and claimed in my prior application, Serial No. 473,949, filed January 29, 1943.

Fig. 1 also illustrates means including spray pipes W and WA for returning a portion of the heated and treated bath liquor to the saturator bath through the gas space of the saturator, so that it serves as a liquid washing agent for preventing or minimizing rock salt deposits on the saturator walls. The spray pipe W is in the form of a spray ring surrounding the upper end portion of the cracker pipe B, and is adapted to spray a liquid washing agent against the cracker pipe and against the adjacent inclined top wall of the saturator shell to wash off sulphate deposits. The pipe WA has its discharge end within the gas outlet E. As shown, the pipes W and WA are connected through regulating valves W' and WA', respectively, to a branch WB from the pipe P' through which heated bath liquor passes from the heater R to a regulating valve $M^4$ and thence to the return pot P. A hot water supply pipe WC' may be used to supply some or all of the washing fluid discharged through the pipes W and WA, depending on the adjustment of valves WB' and WC' through which the pipes WB and WC are respectively connected to the discharge pipes W and WA. Except in respect to the manner in which they are supplied with hot washing fluid, the pipes W and WA do not differ in form or disposition from saturator wall washing spray pipes disclosed and claimed in my said prior application, Serial No. 473,949.

As already indicated, the return to the saturator through the pipe I of bath liquor withdrawn through the outlet D and tar separator N, may be continuous or intermittent. When liquor withdrawn through the outlet D is returned through the pipe I continuously and at a suitable rate, suitably large crystals may be continuously withdrawn from the saturator through the chamber $A^4$ and outlet $A^3$ at an approximately constant rate when gas is passed through the saturator at a substantially constant rate as is customary. Advantageously, in such continuous operation, the rate at which liquid is returned to the saturator through the pipe I will be appreciably in excess of the rate at which liquor is withdrawn through the outlet $A^3$, so that there will be a continuous upflow of liquor from the chamber $A^4$ into the saturator tank space above that chamber.

Crystals of a size not exceeding a predetermined minimum may be prevented from passing into the chamber $A^4$ from the main body of the bath above that chamber, by returning liquor to the chamber $A^4$ through the pipe I at a rate suitably in excess of the rate at which liquor is withdrawn from that chamber through the crystal outlet $A^3$. If the liquor in the chamber $A^4$ were quiescent, crystals would settle in the chamber at a rate depending on the size of the crystals. Thus, for example, when the bath liquor is of normal density, crystals just too large to pass a 35 mesh screen will have a sinking or settling velocity in the saturator of a little less than six feet per minute, whereas crystals just small enough to pass a 70 mesh screen will have a settling velocity of about two and one-third feet per minute. In consequence, if liquid flows upward continuously out of the upper end of the chamber $A^4$ with a uniform velocity of about 2⅓ feet per minute, no crystals small enough to pass a 70 mesh screen would move downward through the chamber $A^4$. In practice, the upflow velocity will not be uniform at all points in the upper portion of the chamber $A^4$, but with the density and crystal sizes mentioned above, an average liquor upflow velocity in the upper portion of the chamber $A^4$ of three to four feet per minute will prevent any significant amount of crystals small enough to pass a 70 mesh screen from settling into the chamber $A^4$ from the bath liquor above that chamber.

The gaseous discharge into the chamber $A^4$ through the spray pipe G, increases the average linear upflow velocity through the upper portion of the chamber $A^4$, resulting from a given excess of the quantity rate of liquor flow in the pipe I over that through the outlet $A^3$. While the gas discharged by the spray pipe G tends to reduce the average fluid density in the chamber $A^4$, the net result of the gaseous discharge from the pipe G is to reduce the excess of flow in the pipe I over that in the outlet $A^3$ needed to prevent appreciable movement of crystals of a given small size downward through the chamber $A^4$. As will be apparent, an increase in the upflow velocity along the peripheral wall of the chamber $A^4$ decreases the tendency to the adherence of crystal deposits on that wall.

The excess of the liquor flow in the pipe I over that in the crystal outlet $A^3$ contributes, as does the gaseous jet discharges by the spray pipes G and GA, to the agitation and recirculation in the main body or zone of bath liquor above the separation zone, which is essential to the efficient recovery of ammonia from the gas brought into scrubbing contact with the bath liquor and to the proper growth of the sulphate crystals formed. The agitation and recirculation needed for such purposes is augmented in the apparatus shown in Fig. 1 by the provision of the ribs $B^2$ on the underside of the cracker pipe mouthpiece. Such agitation and recirculation may be further augmented by the use of other expedients heretofore used to increase the agitation and circulation of the bath liquor in ammonia saturators.

While there are obvious advantages in the continuous operation just described, special advantages may be obtained by intermittently opening and closing the valve M, so that the rate at which bath liquor is returned through the pipe I may be approximately equal to the minimum rate required to prevent an objectionable discharge of undesirably small crystals through the outlet $A^3$, during periods which alternate with other periods during which the rate of bath liquor return through the pipe I is substantially in excess of the last mentioned rate. With such intermittent return of bath liquor through the pipe I, the rate at which large crystals are withdrawn through the outlet $A^3$ will also be intermittent, being greater during periods in which the rate of return through the pipe is relatively small than during periods in which the last mentioned rate is relatively large. By thus making the rate of liquor return relatively large flow conditions may be maintained in the crystal separating zone portion of the saturator bath, which will prevent or greatly reduce the tendency of the crystals to form rocksalt deposits on the wall of the chamber $A^4$ and on the immediately adjacent conical portion of the saturator wall. Such increase in the rate of liquor return to the saturator results in an increase in the turbulence and magnitude of the liquor movement, in and out of the separation zone effective to dislodge crystal masses in the initial stages of their conversion into rocksalt deposits.

The effectiveness of the provisions shown in Figs. 1 and 2 for excluding small crystals from the separation zone is augmented by the relatively small horizontal cross section of the spaces or passages through which the liquor returned by the pipe I and the gas discharged by the spray pipes move upward away from the latter. The form and disposition of said passages also contribute to the tendency of the bath liquor flow to prevent rocksalt deposits. The special advantages thus obtained with the particular arrangement shown in Figs. 1 and 2, may be obtained with other and quite different arrangements, one example of which is illustrated in Fig. 3, and other examples are illustrated in Figs. 4 and 5.

The arrangement shown in Fig. 3 differs from that shown in Fig. 2 in the omission of the chamber $A^4$ and spray pipe G. In Fig. 3, the spray pipe GA is arranged in close proximity to the portion of the conical saturator wall shown in Fig. 2 immediately above the outlet A3. In Fig. 3, however, the cross section of the annular port or flow passage surrounded by the pipe GA is reduced by increasing the cross section of the portion of the pipe I at the level of the pipe GA. As shown in Fig. 3, the pipe I is formed with a conical enlargement $I^5$ at its lower end, and the lower edge of said enlargement is at or near the level of the under side of the nozzle GA. Advantageously and as shown, a horizontal deflection plate $I^6$, coaxial with the pipe I and shown as somewhat smaller in diameter than the lower end of the conical enlargement I⁵, is located at a level slightly below the lower edge of said enlargement, so as to deflect the liquid discharge by the pipe I away from the axis of the latter. As shown in Fig. 3, the separation zone is surrounded by a portion A⁵ of the conical tank wall below the level of the spray pipe GA which is thickened to restrict the cross section of the annular flow passage between the lower edge of the conical portion I⁵ of pipe I and the adjacent surface of the wall portion A⁵.

In the modification shown in Fig. 4, a chamber A⁴ is interposed between the outlet A³ and the lower end of the conical space in the lower portion of the saturator, as in the construction shown in Figs. 1 and 2. In Fig. 4, however, the bath liquor returned to the separation zone of the saturator is passed into the chamber A⁴ through an inlet IA' in the cylindrical wall of the chamber and a supply passage IA. The latter extends tangentially of the cylindrical inner wall of the chamber A⁴ away from said inlet IA'. At its other end, the passage IA is connected to receive bath liquor from pipes J⁴ and S¹. The pipes J⁴ and S¹ of Fig. 4 may be associated with a saturator exactly as in arrangement shown in Fig. 1, except in respect to the manner in which the return bath liquor is passed from them into the chamber A⁴.

As shown, however, the spray pipe G of Fig. 1 is omitted in Fig. 4, since the turbulence and flow conditions in the chamber A⁴ and in the lower portion of the saturator tank space obtainable with the bath liquor introduced tangentially into the chamber A⁴, may provide enough agitation to make the spray pipe G unnecessary. Moreover, with the agitation and character of bath liquor flow in the chamber A⁴, obtainable with the arrangement shown in Fig. 4, in some cases at least, the rates at which liquor is returned through the pipe SI need not be intermittent or pulsating, so that the valve M may be omitted or kept open continuously.

With the diameter of the chamber A⁴ of Fig. 4 suitably proportioned to the rate at which treated bath liquor is passed into the chamber through the tangential passage IA and inlet IA', the turbulence, direction and magnitude of the liquor flow in the chamber A⁴ may be made as great as may be desired. In consequence, the small crystal content of the liquor in the chamber A⁴ of Fig. 4 may be kept suitably low without the use of a spray pipe G in the chamber shown in Figs. 1 and 2. Furthermore, the bath liquor moving spirally about the axis of the chamber A⁴ away from the inlet IA', is a very effective agent for preventing rocksalt deposits on the wall of the chamber and on the portion of the conical bottom wall of the saturator immediately above said chamber.

Substantially the same operative results obtainable with the construction shown in Fig. 4, are obtainable with the construction shown in Fig. 5, in which bath liquor is returned to the separation zone through a pipe axially disposed in the saturator, as is the pipe IB shown in Fig. 1. The discharge end of the pipe IB extends into a chamber A⁴ similar to the chamber A⁴ of Fig. 4, and with means for discharging the return liquid in one or more jets tangential to a circle concentric with the axis of the pipe IB. As shown in Fig. 5, vanes IB' are located between and may be welded to the lower end of the pipe IB' and a lower transverse plate or disc IB² and form the side walls of channels through which the returned liquor is discharged in a plurality of tangential jets. Those jets create the same kind of flow conditions within the chamber A⁴ of Fig. 5, and upward out of that chamber, as are produced in Fig. 4, by returning the liquor through the tangential inlet I'.

With all of the forms of apparatus disclosed for maintaining a crystal separation or outlet zone consisting wholly or substantially of bath liquor having a relatively low small crystal content, it is possible by reducing the rate at which bath liquor is returned to said zone and by increasing the bath acidity, to decrease the size of the crystals produced. Moreover, by interrupting the return of bath liquor through the pipes I, IA and IB, it is practically possible to operate the saturators to which said pipes pertain, as required for the production of the small crystal sulphate heretofore commonly produced in this country. Market conditions at times may make such operation desirable.

In the arrangement shown in Fig. 6 the saturator tank bottom outlet A³ connects the lower end of the conical or hopper bottom portion of the saturator chamber to the upper end of a special fitting Z interposed between the outlet A³ and the pump inlet F'. The fitting Z is formed with a central vertical passage Z' of relatively large cross section which is below and in register with the passage A³ and through which the heavy sulphate crystals gravitate from the lower portion of the saturator into the pipe F. Surrounding the central passage Z' is an annular passage Z² having an inlet receiving the discharge from the pipes S' and J⁴ and communicating with the passage Z' through a circular series of small ports Z³.

The quantity rate of liquor flow through the pipe J⁴ will be substantially proportional to, and but slightly less than the flow through and away from the saturator through the pipe F'. By suitable adjustments of the valve M in the pipe S', the sum of the flows through the pipes S' and J⁴ may be made equal to, or less or greater than the flow through the pipe F'. The direction and rate of flow through the outlet A³ may thus be regulated as conditions make desirable.

In respect to its action in screening small crystals out of the stream of larger crystals passing away from the saturator through its outlet A³, there is no difference in general principle between the apparatus shown in Fig. 6 and that shown in the other figures.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. Apparatus for producing sulfate of ammonia by scrubbing contact of distillation gas with sulfuric acid liquor, comprising in combination a saturator having a hopper bottom portion, the walls of said hopper bottom portion being prolonged in a lower section thereof to form a space therein inclosed by substantially vertical walls, an overflow outlet above said hopper portion, a bottom outlet from said hopper bottom and said lower section space, a crystal separator, conduit means including pumping means providing passage from said bottom outlet to said separator, a receiver, conduit means from said overflow outlet to said receiver, return conduit means from said separator having a discharge end into said lower section space and conduit means providing passage from said receiver to said lower section space.

2. Apparatus for producing sulfate of ammonia by scrubbing contact of distillation gas with sulfuric acid liquor, comprising in combination a saturator having a hopper bottom portion, the walls of said hopper bottom portion being prolonged in a lower section thereof to form a space therein inclosed by substantially vertical walls, an overflow outlet above said hopper portion, a bottom outlet from said hopper and said lower section space, a crystal separator, conduit means including pumping means providing passage from said bottom outlet to said separator, a receiver, conduit means from said overflow outlet to said receiver, return conduit means from said separator having a discharge end into said lower section space and conduit means providing passage from said receiver to said return conduit means at a point intermediate the saturator and separator.

CARL OTTO.